Feb. 10, 1942. C. F. VAN HOOK Re. 22,024

TORQUE BAND BRAKE

Original Filed June 26, 1939 6 Sheets-Sheet 1

INVENTOR
CHARLES F. VAN HOOK
BY
Chas. Lyon Russell
ATTORNEY

Feb. 10, 1942. C. F. VAN HOOK Re. 22,024

TORQUE BAND BRAKE

Original Filed June 26, 1939 6 Sheets-Sheet 2

INVENTOR
CHARLES F. VAN HOOK
BY
Chas Lyon Rumsey
his ATTORNEY

Feb. 10, 1942. C. F. VAN HOOK Re. 22,024

TORQUE BAND BRAKE

Original Filed June 26, 1939 6 Sheets-Sheet 3

INVENTOR:
CHARLES F. VAN HOOK
BY Chas. Lyon Russell
his ATTORNEY

Feb. 10, 1942. C. F. VAN HOOK Re. 22,024

TORQUE BAND BRAKE

Original Filed June 26, 1939 6 Sheets-Sheet 4

INVENTOR.
CHARLES F. VAN HOOK
BY
Chas Lyon Russell
his ATTORNEY.

Feb. 10, 1942. C. F. VAN HOOK Re. 22,024

TORQUE BAND BRAKE

Original Filed June 26, 1939 6 Sheets-Sheet 5

INVENTOR
CHARLES F. VAN HOOK
BY
his ATTORNEY

INVENTOR:
CHARLES F. VAN HOOK
BY Chas Lyon Rumsey
his ATTORNEY

Reissued Feb. 10, 1942

Re. 22,024

UNITED STATES PATENT OFFICE 22,024

TORQUE BAND BRAKE

Charles F. Van Hook, Warren Point, N. J.

Original No. 2,253,740, dated August 26, 1941, Serial No. 281,132, June 26, 1939. Application for reissue December 23, 1941, Serial No. 424,173

9 Claims. (Cl. 57—18)

This invention relates to means for applying pressure or braking action to the material which is wound upon wire or cable, this material generally being furnished in the form of a pad.

The invention also relates to lever-governed adjustable torque band brakes which are used to apply pressure or braking action to such material as it is wound out.

In taping operations which occur in the manufacture of electric wire and cable and in some constructions of hose, machines, termed taping heads in the trade, have been employed. These units feed the tape from pads, each pad having a center hole which holes are for mounting the pads on their carrying spindles or centers.

In the general case, in order to provide tension in the tape as it passes from the pad to be wrapped around a cable, or wire or hose, a brake is provided on each pad and in the general case, this has been either an enveloping band or disc brake which for any setting, produced constant torque in the pad, and consequently caused tension to rise as the pad ran down. Thus, if the pad outside diameter were three times the pad center spindle diameter, for any one setting of brake throughout the pad, the tension on the tape at the finish became three times that at its beginning. To overcome this great and usually impracticable rise in tension, adjustment of the brake setting usually was made as the pad ran off, to endeavor to approximate constant tension. This, of course, necessitated stopping the head for every adjustment made to the brake.

I have provided a mechanism which will allow a single setting of the brake which will allow the pad to run down without necessitating the operator's changing this setting to reduce the tape tension. This setting is adjustable so as to allow the required variation or range of tape tensions which the employment of these heads require.

The compound float control lever which is part of my invention is so operative that when the tape breaks, the holding torque of the brake immediately rises considerably, thus preventing any loosening of the outer tape convolutions of the pad. Then the actual lever on which the control roll for the tape is mounted, is a compound-lever —this so that this roll will have a long float or drift arc. This is for the purpose of avoiding tape breaks at quick stops and also to even out slight variations in tension due to brake float action as already explained.

While I regard it as impossible to devise a mechanical mechanism which will give a constant or uniform tension, yet the mechanism of the present invention will give a fully satisfactory arrangement through a lever device. This arrangement of lever-governed band brake has reference to any feeding run from a progressively decreasing diameter and but one setting of the brake for any tension value desired of the material.

In the drawings accompanying this specification, two practicable embodiments of the invention have been illustrated in which drawings—

Figure 1:
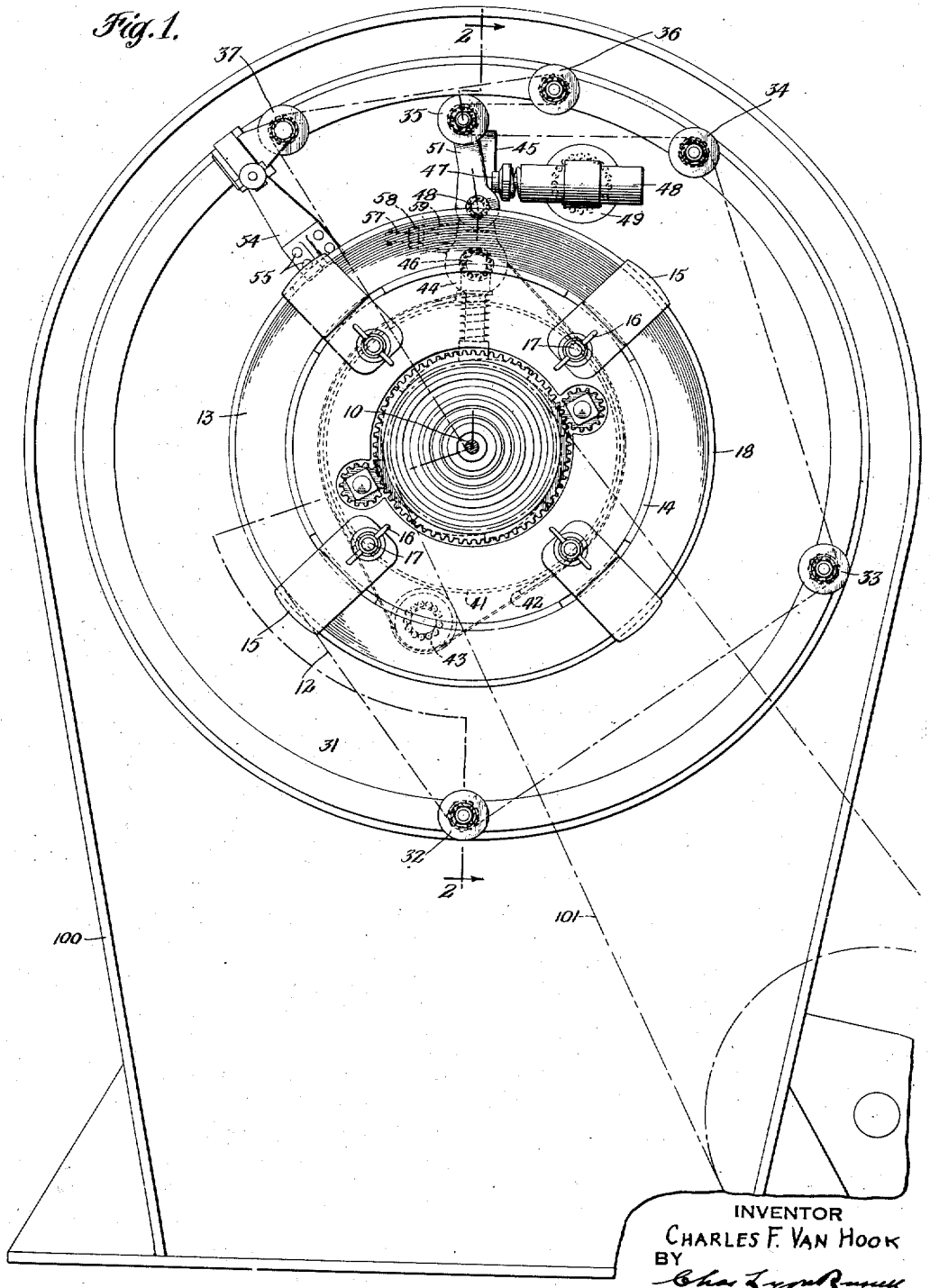
Figure 1 is an end view of a mechanism for applying one band of material to a moving device.
Figure 2:
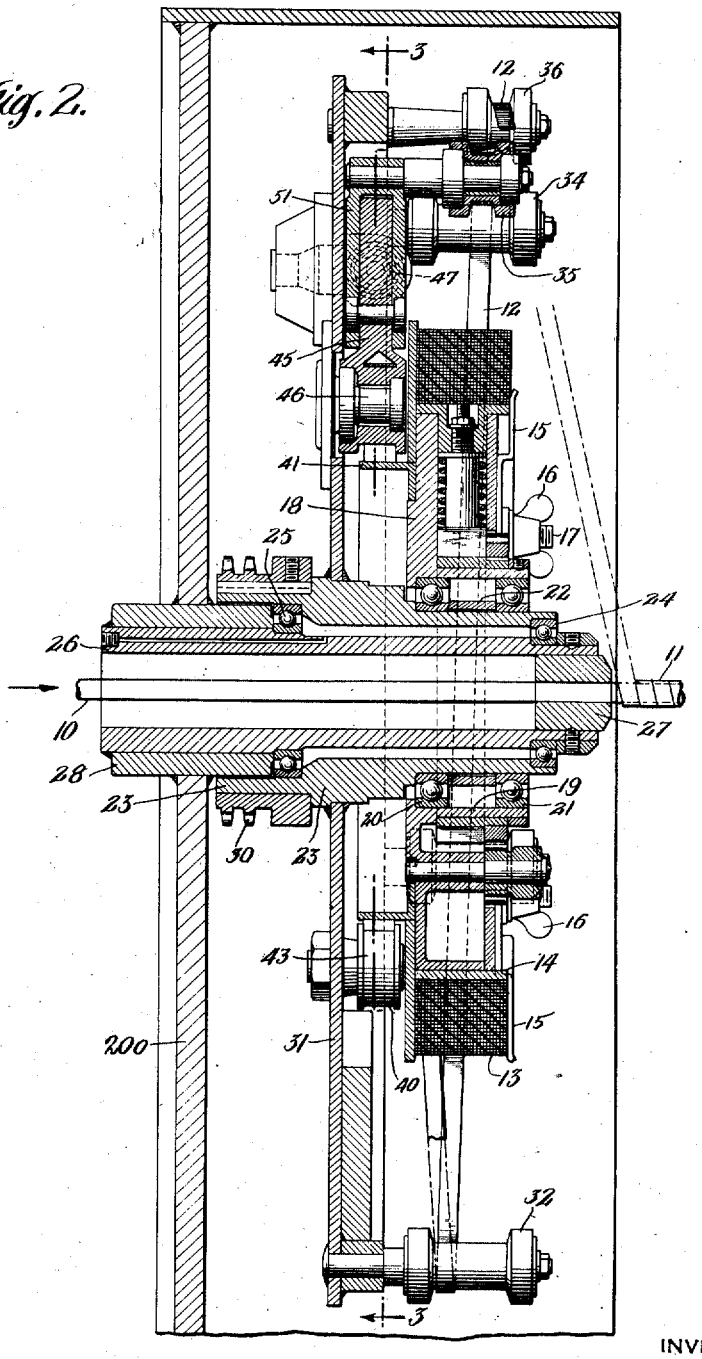
Figure 2 is a section of Figure 1 taken at about the line 2—2 of Figure 1. It will be noted that this line deviates somewhat from a straight line, but this is for the purpose of showing the mechanism as it exists.
Figure 3:
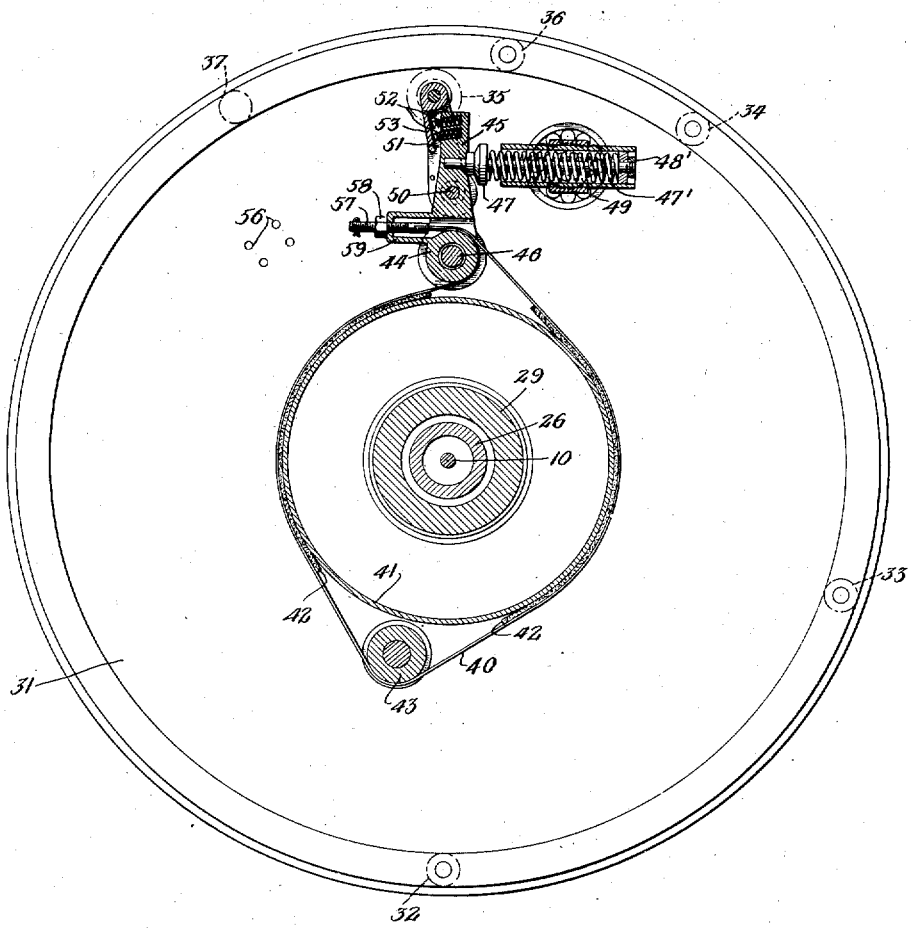
Figure 3 is a view showing the pad of material, the brake drum on this and the braking mechanism separated somewhat from the rest of the machine, this view is at about the line 3—3 of Figure 2.
Figure 6:
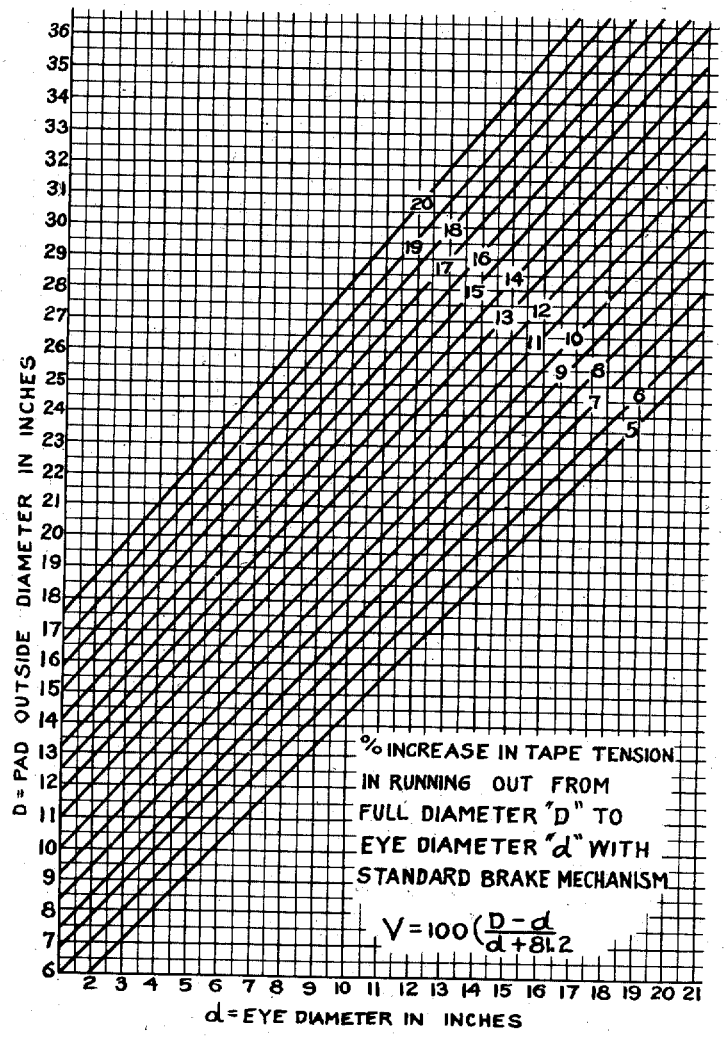
Figure 6 is a chart and formula which have reference to the operation of the device.

This description at the present time will deal with Figures 1, 2 and 3 and also with the chart of Figure 6. While I am not dealing with the method for advancing the wire 10, yet it will be assumed that this is pulled through the machine, or may be manufactured if it is a cable or some such device. In Figures 1 and 3 it is assumed to be coming toward the observer and in Figure 2 it is supposed to be running from the left hand side to the right hand side and has wrapped upon it a coating 11 which, in the present instance, is a narrow band 12 which is supplied from a pad of material 13 which is shown wrapped upon a drum 14. While this invention relates primarily to the mechanism for applying tension to the strip of material 12 as it is led off the drum and applied to the material being treated, yet, for the purpose of this description, it will be best to describe the action of the material and lead up to the means for applying the tension which will appear in its proper place in the description of the entire mechanism.

The drum 14, and its associated parts, carrying the pad of material, is caused to rotate about the parts which are adapted to carry the wire 10.

The pad of material 13 in this illustration comprises a drum 14 which is held by means of suitable clips 15 which are adjusted by means of thumb nuts 16 to screws 17 projecting from the main plate 18 upon which the drum 14 is mounted. This is a mere rudimentary description; it might be well to interrupt and state that the plate or the frame member 18 has a bore 19 in which are shown mounted a pair of anti-friction bearings 20 and 21 and between the inner races of which there is a spacing plate 22. The inner races of the bearings are shown mounted upon a framing member 23 which carries, by means of a pair of ball bearings 24 and 25, the tubular member 26 through which the member 10 to be coated, with the material 12 passes, it having at its right hand end in Figure 2 a plug 27 through which the material 10 passes.

In Figure 2 the sleeve 26 is shown mounted in a sleeve 28 which is shown secured to the machine frame 200 and do not in the present showing rotate. The bearings 24 and 25 are separated on the sleeve 26.

Mounted on the outer members of the bearings 24 and 25 is the sleeve 23, which is driven by a sprocket wheel 30 from some suitable train and which sleeve has fast on to it a plate 31 which carries a mechanism for wrapping the tape 12 around the member 10. The tape 12 is shown as being taken off that part of pad or reel which in the position of the parts shown in the drawings is the lower part, and passes over pulleys 32, 33 and 34, this pulley 34 being adjacent to but at an appreciable distance from the pulley 35 which pulley 35 is mounted upon the second lever 51, the first lever however being 45 and which levers are presently to be described, the tape then passes over a pulley 36 and in its passage from the pulley 35 to such pulley 36 it runs about parallel to part of the run from the pulley 34 to 35. From pulley 36 the tape passes to pulley 37 and in this instance makes more than a passage of 180° about the pulley 36, it then turns around the pulley 37 and passes somewhat obliquely to its point of application to the member 10.

It is to be observed that the tape 12 wound on the pulley 13 is of the winding known to the trade as Universal. This back and forth winding of the material, to be wrapped upon the member 10, requires that the body portion of pulley 32 be quite wide between its ends to permit of the necessary tape movement across it, so also with several others of the pulleys as, for instance, the pulley 34.

The brake, see Figure 3, comprises a torque band member or belt 40 having located at its places of application to the drum 41 which is fast with the rotary member 18 some friction material 42. The belt where it passes does not engage the pulley 43, and over the drum 41 need not have the friction material applied to it. The torque band, after it passes around the drum 41 is brought around a member 44 which, in the present instance, is in the form of a wheel fast on the first lever 45. The lever 45 is mounted by means of a pin 46 to the plate 31. This lever is engaged by a spring plunger 47 which, and its spring 47', is carried by a barrel 48 and which barrel is mounted on a ball bearing 49 set in the plate 31. The tension of the spring 47' is regulated by the nut 48' working on the end plunger rod. The direction of pressure is opposed to the drag of the material. Pivoted at 50 on lever 45 is the second lever 51 which carries the pulley 35 about which the material is wrapped.

While the first lever 45 is pressed by the stronger spring plunger 47, the second lever 51 is moved in the same direction as the lever 45 in the present illustration by means of the weaker coil springs 52 located in said lever 45.

By this arrangement a moderate change of pull on the material which is running over the roller 35 will move the lever 51 on its pivot 50. A strong pull will completely press the portion 53 of this lever against the end of the lever 45 and will thus act on the lever 45 to compress the spring 47', which will release the action of the torque band 40.

Although the pulleys 32 to 37 would not appear on the view of Figure 3, yet they have been shown in dotted lines for clearness of illustration. The pulley 37, see Figure 1, is mounted on a member 54 which is secured to the plate 31 by means of rivets 55, the holes for such rivets are shown at 56 on Figure 3.

The two ends of the band 40 pass around the member 44 and are united in the end of a screw 57 which has a nut 58 for its adjustment, it passing through a housing 59 which is a part of the lever 45.

It might be well at this point to describe the operation of the mechanism which is intended to wrap the band 11 onto the material 10 which is passing out of the nozzle 27. The machine frame 100 remains stationary as do the parts 28, 26 and 27 so that the wire itself, or other material 10 which is to be coated, does not rotate. The plate 31, and the parts associated with it do rotate. Briefly, the material 12 is wound off the reel 13, passes the pulleys 32, 33, 34 and 35 which is on the second lever, bends back upon itself, passing the pulley 36, then bends back upon itself again and passes the pulley 37 from which it extends, downwardly in the position illustrated and is wrapped at 11 around the wire, or other material being treated. The head is rotated by means of a band which passes over the pulley which in the present instance is shown as a two cog or sprocket wheel 30.

It will be noted that owing to the manner of winding up the material 13 on the drum 14 that the pulleys 32, 33 and 34 will have to have considerable space between their heads whereas as the material approaches its point of application, the pulleys 35 and 36 more nearly conform to the width of the material.

Figure 4:
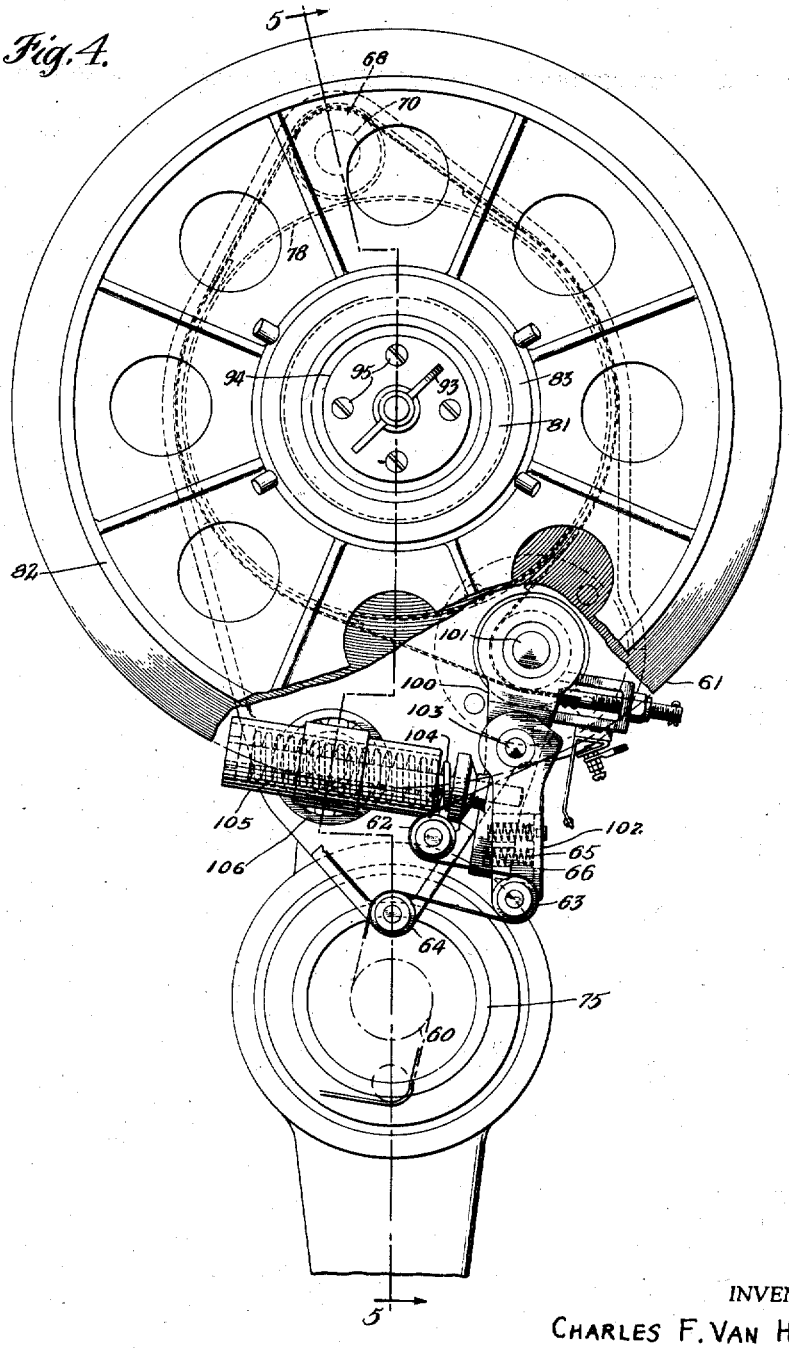
Figure 4 is a head somewhat like that shown in Figure 1, but it is one of multiple heads which operate to supply respective windings to the moving part.
Figure 5:
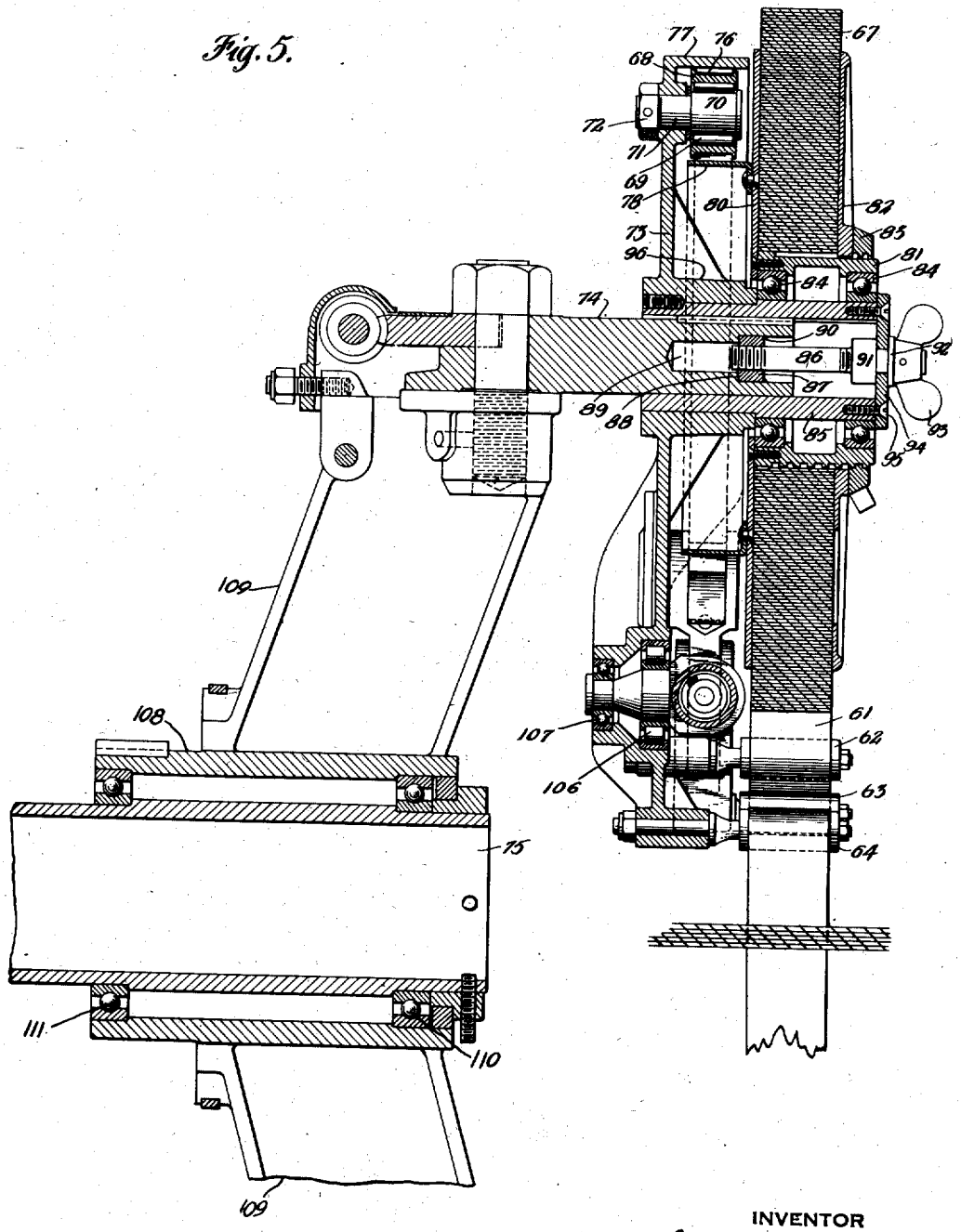
Figure 5 is a view taken at about the line 5—5 of Figure 4—the line of this view is also not quite straight.

Sometimes it is desirable to apply a plurality of strips of material to the article being wound, either the same material or different wrappings of different materials as the case may require. In one form of my invention I have several such heads, three being used in some of my machines. One form of the head is illustrated in Figures 4 and 5. The brake mechanism is practically the same, but some of the details are shown a little more clearly.

The amount of material carried by the drum is shown as greater in this illustration and it passes more directly to the point of application 60, that is, it passes from the drum at 61 over the pulley 62, passes over the pulley 63 on the second lever, then doubles back upon itself to a pulley 64, then to the point of application 60.

The pads of material 67 revolve about article 60 being wrapped but do not rotate.

The first lever in this instance is represented at 100 and being pivoted at 101. The second lever 102 is pivoted to it at 103. The spring which is acted upon by the first lever is represented at 104 and is carried by a housing 105 which is mounted by means of a roller bearing 106 and a ball bearing 107 in the frame member 73.

The springs between the first lever 100 and the second lever 102 are shown at 65 engaging a face 66 of the second lever and rest in sockets in the first lever.

The spools, or pads, of which the pad 67 is representative, are rotated about their axes 74 which in turn are caused to revolve about the member 75. They are carried by a hub member 108 by arms 109 which rotate on ball bearings 110—111 on the stationary member 75. The torque band 76 is represented in Figure 5, passing over a pulley 68, this torque pulley 68 is shown mounted on antifriction bearings, in the present illustration, shown as roller bearings having rollers 69. The rollers run upon a part 70 which has a reduced portion 71 held in a bearing in the plate 73 by means of a screw 72; an overturned portion 77 of the rotating member 73 houses this portion of the apparatus. The torque drum 78 which is connected with the spool upon which the material 67 is wound engages the parts substantially as that described in the mechanism connected with Figure 3.

It may here be stated that the spool comprises a plate member 80 which has fast on it the torque drum 78. This plate is fastened to an internal member 81 which has a plate 82 on the other side of the material 67 and a hub member 83 resting upon the member 81. There are a pair of ball bearings 84 within this hub member 81 which run upon a member 85 which is held by means of a key to the shaft member 74. The spool is adjustable in and out on the shaft 74 by means of a screw 86 which engages a nut 87 which seats against a ledge 88 in the bore 89. Preferably, the nut is soldered in place as seen at 90 so that the head 91 and the flange 92 on the screw member 93 will cause this entire spool and its associated mechanism to be moved in either direction on the shaft 74. The heads 91 and 92 engage a flange 94 which is fast by means of screws 95 to the member 85. This flange also serves to hold the inner race of one of the ball bearings 84 in place, the other bearing engaging the hub member 96 of the wheel 73.

Reference will now be made to the chart which is illustrated on Figure 6 in which D represents the pad outside diameter in inches and $d$ represents the eye diameter in inches so that if the eye diameter $d$ is 6 inches and the outside diameter D is 18 inches the variation and running out from full diameter D to eye diameter $d$ with the brake mechanism, which I have described, will increase about 14%.

On the chart is also represented a formula $$V \text{ equals } 100\left(\frac{D \text{ minus } d}{d \text{ plus } 81.2}\right)$$

D and $d$ are the full and empty diameters of the roll or pad from which the sheet or strip is run off, the dimensions being given in inches.

I believe that I am the first to have provided a lever governed adjustable torque band brake especially of the type herein described in which any single setting restricts tension variation on the strips or sheets during the entire running out or paying out of the strip within the percentage above indicated.

Although some forms for carrying out my invention have been illustrated, yet it is to be understood that changes may be made within the scope of the claims without departing from the spirit of my invention.

The numeral 81.2 might be replaced by a constant C. The form as given above is less involved.

Having thus described my invention, I claim and desire to secure by Letters Patent the following:

1. In a device of the character specified, the combination with means for holding an advancing wire or cable, of a spool upon which is wound a strip or sheet of material it having its pay out revolvable about the wire or cable, and which strip, or sheet, is adapted to be paid out to the wire or cable upon which it is wound, a brake drum connected to the spool and having an adjustable torque brake band upon it; and a compound float lever; any single adjustment restricting the tension variation on the strip from full to empty condition within the percentage of $$V = 100\left(\frac{D-d}{d+81.2}\right)$$

where D and $d$ are the full and empty diameter of the roll or pad from which the sheet or strip is run off.

2. The combination with means for holding material to be wound on a moving body, of a brake drum, a brake band surrounding the drum, a first lever having means around which the brake band may be wound, a spring acting upon the first lever against the direction of pull of the material being wound, a second lever pivoted to said first lever, the second lever having means over which the material being wound passes, spring means lighter than that acting upon the first lever but acting in the same direction for permitting the movement of said second lever on said first lever, such material passing over a fixed pulley, over the pulley on the second lever to another fixed pulley on the machine, and then to the point of winding.

3. The combination with means for holding a pad of material to be wound upon a continuously fed body, of a drum on the pad for the application of a torque brake, a torque brake comprising a band passing around the said drum, means for tightening the torque band comprising a first lever having a member over which both sides of the brake band extend, a spring acting upon the first lever against the direction of pull of the material being wound, a second lever pivoted thereto, the second lever having spring means lighter than that acting upon the first lever but acting in the same direction, said second lever having a pulley over which the material passes in its passage from the pad, the material being wound passing over a fixed pulley, over the pulley on the second lever to another fixed pulley on the machine, and then to the point of winding.

4. The combination with means for rotatably supporting a pad of material to be wound off, a brake drum thereon concentric with its axis of rotation, a brake having a band passing over the drum, a first lever pivoted to the supporting means and extending substantially radially thereof and having a wheel centered with its axis over which the brake band passes, means for applying spring pressure to said lever, means for adjusting the brake band, a second lever pivoted to the first lever, spring means acting upon said second lever in the same direction as upon the first lever but weaker, the second lever having a wheel over which the material to be wound passes, a plurality of pulleys over which the material passes in going from the pad, then over the pulley on the second lever, another pulley located backwardly of the second lever pulley and a pulley located forwardly thereof over which the material is fed to the point of winding.

5. The combination with means for holding material to be wound, of a brake drum associated therewith, a free wheel, of a torque brake comprising a band passing around the said free wheel and drum, means for tightening the band comprising a first lever pivoted substantially opposite the free wheel and having a wheel portion fastened to it concentric with its pivot over which the two joined together ends of the band pass, means acting on such joined ends for adjusting the tension of the band, the said first lever extending substantially radially from the axis of rotation, a strong spring acting on the said lever, a second lever pivoted to the first lever and also extending substantially radially, a weaker spring between the two levers and acting in the direction of said strong spring, said second lever having a pulley over which the material passes.

6. The combination with means for holding material to be wound, of a brake drum associated therewith, a free wheel, of a torque brake comprising a band passing around the said free wheel and drum, means for tightening the band comprising a first lever pivoted substantially opposite the free wheel and having a wheel portion fastened to it concentric with its pivot over which the end of the band pass, means acting on such end for adjusting the tension of the band, the said first lever extending substantially radially from the axis of rotation, a strong spring acting on the said first lever, a second lever pivoted to the first lever and also extending substantially radially, a weaker spring between the two levers and acting in the direction of said strong spring, said second lever having a pulley over which the material passes.

7. The combination with means for holding material to be wound, of a brake drum associated therewith, of a torque brake comprising a band passing around the said drum, means for tightening the band comprising a pivoted first lever having a wheel portion fastened to it concentric with its pivot over which the end of the band pass, means acting on such end for adjusting the tension of the band, the said first lever extending substantially radially from the axis of rotation, a strong spring acting on the lever, a second lever pivoted to the first lever and also extending substantially radially, a weaker spring between the two levers and acting in the direction of said strong spring, said second lever having a pulley over which the material passes.

8. The combination with means for holding a pad of material to be wound upon a continuously fed body, of a drum on the pad for the application of a torque brake, a torque brake comprising a band passing around the said drum, means for tightening the torque band comprising a first lever having a member over which both sides of the brake band extend, a spring acting upon the first lever against the direction of pull of the material being wound, a second lever pivoted thereto, said second lever having a pulley over which the material passes in its passage from the pad, spring means lighter than that acting upon the first lever but acting in the same direction.

9. The combination with means for rotatably supporting a pad of material to be wound off, a brake drum thereon, concentric with its axis of rotation, a brake having a band passing over the drum, a first lever pivoted to the supporting means and extending substantially radially thereon and having a spring acting upon the first lever, means for adjusting the brake band, a second lever pivoted to the first lever, spring means acting upon said second lever in the same direction but weaker, the second lever having a wheel over which the material to be wound passes, a plurality of pulleys over which the material passes in going from the pad, then over the pulley on the second lever, another pulley located backwardly of the second lever pulley and a pulley located forwardly thereof over which the material is fed to the point of winding.

CHARLES F. VAN HOOK.